(12) United States Patent
Makabe

(10) Patent No.: US 11,213,896 B2
(45) Date of Patent: Jan. 4, 2022

(54) MAIN SHAFT FOR ROTATING TOOL

(71) Applicant: NISSEI HOMMA MACHINERY CO., LTD., Hyogo-ken (JP)

(72) Inventor: Toshio Makabe, Osaka (JP)

(73) Assignee: NISSEI HOMMA MACHINERY CO., LTD.

( * ) Notice: Subject to any disclaimer, the term of this patent is extended or adjusted under 35 U.S.C. 154(b) by 53 days.

(21) Appl. No.: 16/655,013

(22) Filed: Oct. 16, 2019

(65) Prior Publication Data

US 2020/0130070 A1    Apr. 30, 2020

(30) Foreign Application Priority Data

Oct. 31, 2018 (JP) .............................. JP2018-204597

(51) Int. Cl.
*B23B 31/26* (2006.01)

(52) U.S. Cl.
CPC ...... *B23B 31/265* (2013.01); *B23B 2260/034* (2013.01)

(58) Field of Classification Search
CPC ............ B23B 31/265; B23B 2260/034; B23B 2231/24; Y10T 409/309464; Y10T 409/304032; Y10T 279/17111; Y10T 408/45; Y10T 408/455; B23Q 11/1015; B23Q 11/1023
See application file for complete search history.

(56) References Cited

U.S. PATENT DOCUMENTS

| | | | | |
|---|---|---|---|---|
| 5,690,137 A | * | 11/1997 | Yamada | B23Q 1/0036 137/240 |
| 6,644,900 B1 | * | 11/2003 | Sugata | B23Q 1/70 408/57 |
| 7,367,097 B2 | * | 5/2008 | Nakamura | B23B 31/261 29/27 C |
| 10,335,911 B1 | * | 7/2019 | Huang | B23Q 11/1023 |
| 2003/0170087 A1 | * | 9/2003 | Sugata | B23Q 11/1023 409/136 |
| 2003/0180111 A1 | * | 9/2003 | Sugata | B23Q 11/1015 409/136 |

(Continued)

FOREIGN PATENT DOCUMENTS

| | | |
|---|---|---|
| JP | 04051349 | 4/1992 |
| WO | 2004112999 | 12/2004 |

OTHER PUBLICATIONS

English-language machine translation of Japanese Patent No. JP 2557915 registered Sep. 5, 1996.

(Continued)

*Primary Examiner* — Alan Snyder
(74) *Attorney, Agent, or Firm* — Adams & Wilks

(57) ABSTRACT

A rotating-tool main shaft includes a hollow ram, a hollow main shaft, a collet, a draw bar that moves the collet in the axial direction, a hydraulic cylinder that moves forwardly the draw bar, and a disc spring that moves backwardly the draw bar. The draw bar includes a spring catch which is retained in the hollow main shaft so as to be movable, and which catches the disc spring. The disc spring is placed in the hollow main shaft, and is placed within a distance that is at least a half of a distance from a tip of the draw bar to the spring catch in the axial direction.

11 Claims, 4 Drawing Sheets

(56) References Cited

U.S. PATENT DOCUMENTS

| | | | | |
|---|---|---|---|---|
| 2003/0223834 | A1* | 12/2003 | Choi | B23B 31/261 409/136 |
| 2005/0095075 | A1* | 5/2005 | Schweizer | B23Q 11/1023 409/136 |
| 2005/0236169 | A1* | 10/2005 | Xiao | B23Q 5/326 173/213 |
| 2007/0098511 | A1 | 5/2007 | Kikkawa et al. | 409/231 |
| 2007/0154274 | A1* | 7/2007 | Petrescu | B23B 31/261 409/233 |
| 2015/0078854 | A1* | 3/2015 | Calzavara | B23Q 5/10 409/231 |
| 2017/0225237 | A1* | 8/2017 | Mihailovic | B23B 31/261 |

OTHER PUBLICATIONS

English-language machine translation of Japanese Publication No. 09-183039, published Jul. 15, 1997.

English-language machine translation of Japanese Publication No. 10-029131, published Feb. 3, 1998.

English-language machine translation of Japanese Publication No. 2003-039213, published Feb. 12, 2003.

English-language machine translation of Japanese Publication No. 2010-260142, published Nov. 18, 2010.

English-language machine translation of Japanese Publication No. 2016-059975, published Apr. 25, 2016.

English-language machine translation of Notice of Reasons for Refusal dated Oct. 6, 2020 in Japanese Patent Application No. 2018-204597.

English-language machine translation of Notice of Reasons for Refusal dated Jun. 21, 2021 in Japanese Patent Application No. 2018-204537.

English-language machine translation of Publication No. JP 2008-155315, publication date Jul. 10, 2008.

English-language machine translation of Publication No. JP 2010-179399, publication date Aug. 19, 2010.

\* cited by examiner

MAIN SHAFT FOR ROTATING TOOL

FIELD OF THE INVENTION

The present disclosure relates to a main shaft for a multi-tasking lathe rotating tool (also a "rotating-tool main shaft" below).

BACKGROUND OF THE INVENTION

Multi-tasking lathes that cause a tool (also called a cutting tool), such as a bite or a milling cutter, to rotate around a main shaft to execute cutting and machining on a workpiece have become popular.

According to a multi-tasking lathe, the rotating tool is replaced as appropriate. Hence, many lathes include a tool holding unit called a collet chuck. When operated by a drag link called a draw bar, the diameter of the collet decreases. This diameter-reduction allows the collet to hold the rotating tool. A multi-tasking lathe that includes such draw bar and collet is disclosed in, for example, Japan Patent No. 25579145B.

The technology disclosed in Japan Patent No. 2557915B will be described with reference to FIG. 4.

As illustrated in FIG. 4, a bearing 102 is fitted in a ram 101, and a drive shaft 103 is fitted in the bearing 102. The drive shaft 103 rotates while being supported by the ram 101.

Moreover, an attachment 104 is attached to the tip of the ram 101. A main-shaft housing 105 is fitted in the attachment 104. A bearing 106 is fitted in the main-shaft housing 105, and a hollow main shaft 107 is fitted in the bearing 106. The hollow main shaft 107 rotates while being supported by the main-shaft housing 105.

This hollow main shaft 107 has a tool attachment hole 108 in a circular conical shape formed in a tip, and a collet 109 is embedded in a nearby location to this tool attachment hole 108. The hollow main shaft 107 includes a draw bar 111 which extends from the collet 109 toward the drive shaft 103 and which is built in such a shaft.

This draw bar 111 is mechanically coupled to the drive shaft 103 via a coupling 112.

When the drive shaft 103 is rotated by a drive source, the coupling 112 is rotated, and thus the draw bar 111 is rotated. The rotational force by the draw bar 111 is transmitted to a key 113, and then transmitted to the hollow main shaft 107. The key 113 allows the draw bar 111 to rotate together with the hollow main shaft 107.

A rotating tool 115 is attached to a tool holder 117 that includes a male tapered portion 116. The tool holder 117 has a pull stud 118 formed at a tail section.

The tool holder 117 is fitted in the tool attachment hole 108. The pull stud 118 is inserted in the collet 109. In this condition, when the draw bar 111 is drawn, predetermined frictional force is produced between the male tapered portion 116 and the tool attachment hole 108.

Subsequently, the drive shaft 103 causes the tool holder 117 to rotate, the rotating tool 115 to rotate, and this rotating tool 115 executes cutting and machining.

Meanwhile, the forward movement of the draw bar 111 is executed by a hydraulic cylinder 119 that is fitted in the main-shaft housing 105, and by a piston 121 that is retained in this hydraulic cylinder 119. That is, when hydraulic pressure is applied to the hydraulic cylinder 119, the piston 121 moves forward, and the draw bar 111 is pushed forwardly by this piston 121. The forward movement of the piston 121 compresses a disc spring 122.

The backward movement of the draw bar 111 is executed by the disc spring 122. That is, when the hydraulic pressure to the hydraulic cylinder 119 is released, the disc spring 122 moves backwardly (a pulling side) the draw bar 111. The force by the disc spring 122 keeps the tool holder 117 to be attached to the hollow main shaft 107.

Meanwhile, in view of structural and mechanical components, the hydraulic cylinder 119 may be able to actuate the draw bar 111 to move forwardly or backwardly. When, however, the draw bar 111 is moved backwardly by the hydraulic cylinder 119, and when hydraulic pressure is lost due to blackout, etc., the tool holder 117 is detached from an intermediate main shaft 107. Regarding this point, an adverse effect due to blackout does not act in the case of the disc spring 122.

Because of such a reason, the disc spring 122 is adopted.

The stroke (a forward movement amount) of the draw bar 111 is defined by the structure of the collet 109. Depending on the structure of the collet 109, it is necessary to increase the stroke.

Because the disc spring 122 has a limit in displacement in the axial direction per a spring, in order to increase the stroke of the draw bar 111, it is necessary to increase the number of the disc springs 122.

According to the technology disclosed in Japan Patent No. 2557915B, the number of disc springs 122 is six, but a change in number of such springs to be 20 to 30 may be necessary in practice.

According to the structure disclosed in Japan Patent No. 2557915B, because the key 113 is adopted, the number of disc springs 122 is increased at the coupling 112 side. In this case, the draw bar 111 is to be elongated, and thus the dimension of the rotating-tool main shaft increases.

Since downsizing of the rotating-tool main shaft is being demanded, a structure is desirable which is capable of increasing the number of disc springs 122 without elongating the draw bar 111.

SUMMARY OF THE INVENTION

An objective of the present disclosure is to provide a main shaft for a rotating tool which employs a structure capable of increasing the number of disc springs without elongating a draw bar.

A main shaft for a rotating tool according to a first embodiment of the present disclosure rotates a tool holder which holds therein a rotating tool and which comprises a male tapered portion, and a pull stud provided at a tail section, and such a main shaft includes:

a hollow ram;

a hollow main shaft which is retained in the hollow ram so as to be freely rotatable, and which has a circular conical hole formed in a tip so as to correspond to the male tapered portion;

a collet which is retained in the hollow main shaft and which is coupled to the pull stud;

a draw bar which is retained in the hollow main shaft and which moves the collet in an axial direction;

a hydraulic cylinder that moves forwardly the draw bar; and a disc spring that moves backwardly the draw bar, wherein the draw bar includes a spring catch which is retained in the hollow main shaft so as to be movable and which catches the disc spring, and wherein the disc spring is placed in the hollow main shaft, and is placed within a distance that is at least a half of a distance from a tip of the draw bar to the spring catch in the axial direction.

The number of disc springs is increased in the forward direction (toward the circular conical hole). This provides the rotating-tool main shaft that employs a structure enabling an increase in number of the disc springs without elongating the draw bar.

It is preferable that the draw bar should include: a bar main body that comprises the spring catch; a nozzle attached to a tip of the bar main body so as to be movable in the axial direction; and a spring which is retained in the bar main body and which pushes the nozzle forwardly, and a coolant flow channel through which a coolant flows should be provided in the bar main body and in the nozzle. By providing the coolant to the rotating tool, a high-load cutting and machining is enabled.

It is preferable that a clearance should be provided between an outer circumference of the disc spring and a wall surface of a spring retaining space that retains therein the disc spring, and a fluid should flow through the clearance. Because the clearance instead of the fluid passage is provided outside the hollow main shaft, the hollow main shaft can be thinned. Moreover, because the plurality of disc springs is placed side by side, a tiny amount of heat is generated and a tiny amount of contamination occurs between the adjoining disc springs. By causing the fluid to the outer circumference of the disc spring, this fluid can dissipate the generated heat and eliminate the contamination.

BRIEF DESCRIPTION OF THE DRAWINGS

Several preferable embodiments of the present disclosure will be described in detail below with reference to the figures in which.

DETAILED DESCRIPTION OF THE PREFERRED EMBODIMENTS

Figure 1:
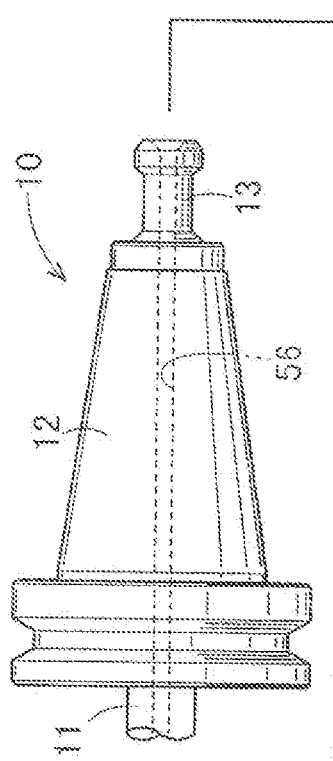
FIG. 1 is a cross-sectional view of a main shaft for a rotating tool according to the present disclosure.
Figure 1:
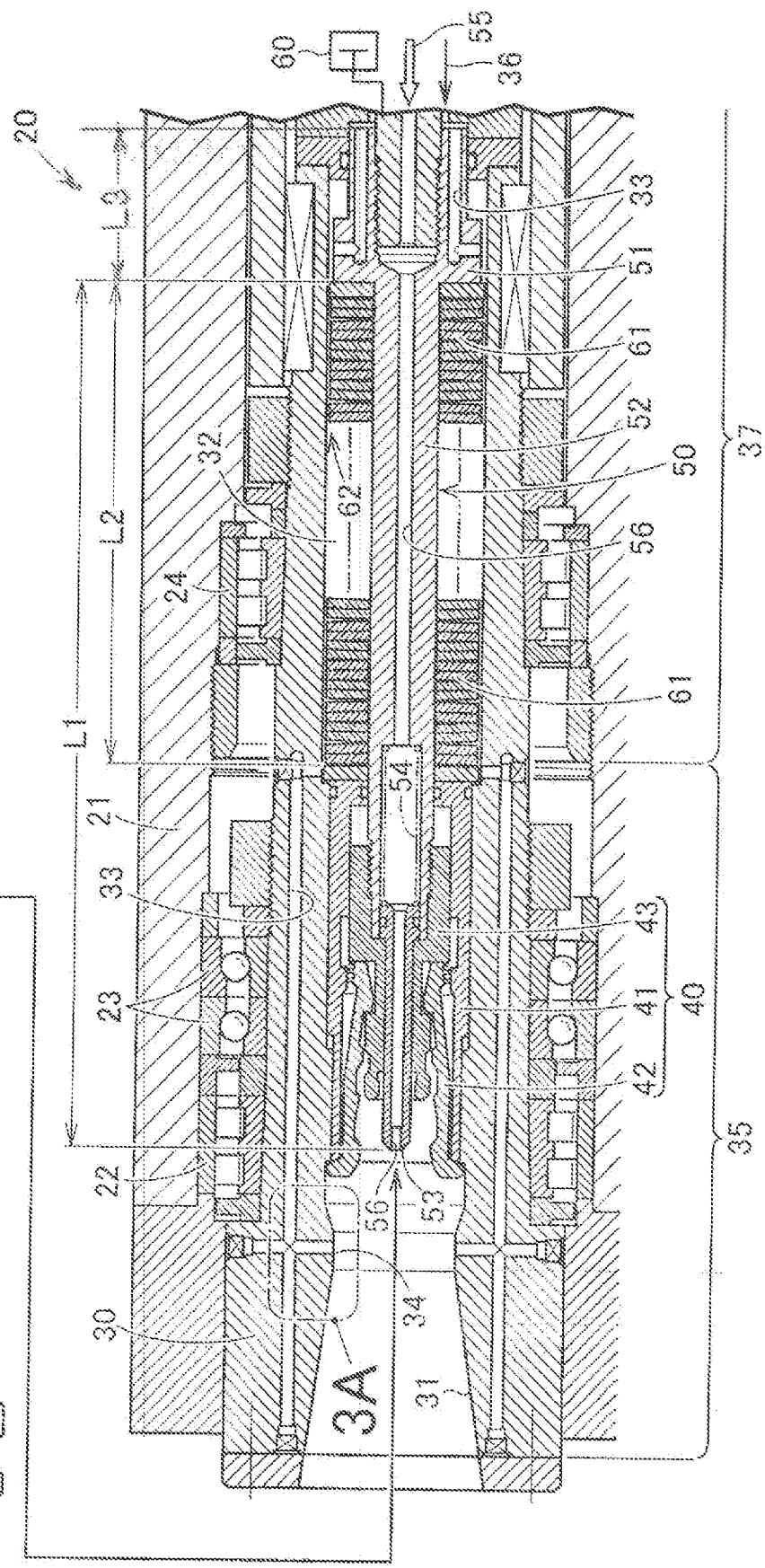

As illustrated in FIG. 1, a tool holder 10 holds therein a rotating tool 11 that is also called a cutting tool, and includes a male tapered portion 12, and a pull stud 13 at a tail section.

The tool holder 10 is rotated by a rotating-tool main shaft 20.

The rotating-tool main shaft 20 includes a hollow ram 21, bearings 22, 23 and 24, a hollow main shaft 30, a collet chuck mechanism 40, a draw bar 50, a hydraulic cylinder 60, and disc springs 61.

The bearings 22, 23 and 24 are fitted in the hollow ram 21, and support the hollow main shaft 30. The hollow main shaft 30 is thus freely rotatable.

The collet chuck mechanism 40 is held in the hollow main shaft 30.

The draw bar 50 has a role of actuating the collet chuck mechanism 40.

The hydraulic cylinder 60 has a role of moving forward the draw bar 50.

The disk springs 61 have a role of moving backward the draw bar 50.

The hollow main shaft 30 has a circular conical hole 31 formed in a tip so as to correspond to the male tapered portion 12, and has a spring retaining space 32 formed in a rear-half portion 37.

The collet chuck mechanism 40 includes a collet retaining cylinder 41 retained in the hollow main shaft 30, a pinch-type collet 42 built in the collet retaining cylinder 41, and a collet driving member 43 which is fastened to the draw bar 50 and which opens and closes the collet 42.

The draw bar 50 includes a spring catch 51 which is retained in the hollow main shaft 30 and which catches the disc springs 61.

The disc springs 61 are placed between the draw bar 50 and the hollow main shaft 30 in the spring retaining space 32.

Figure 4:
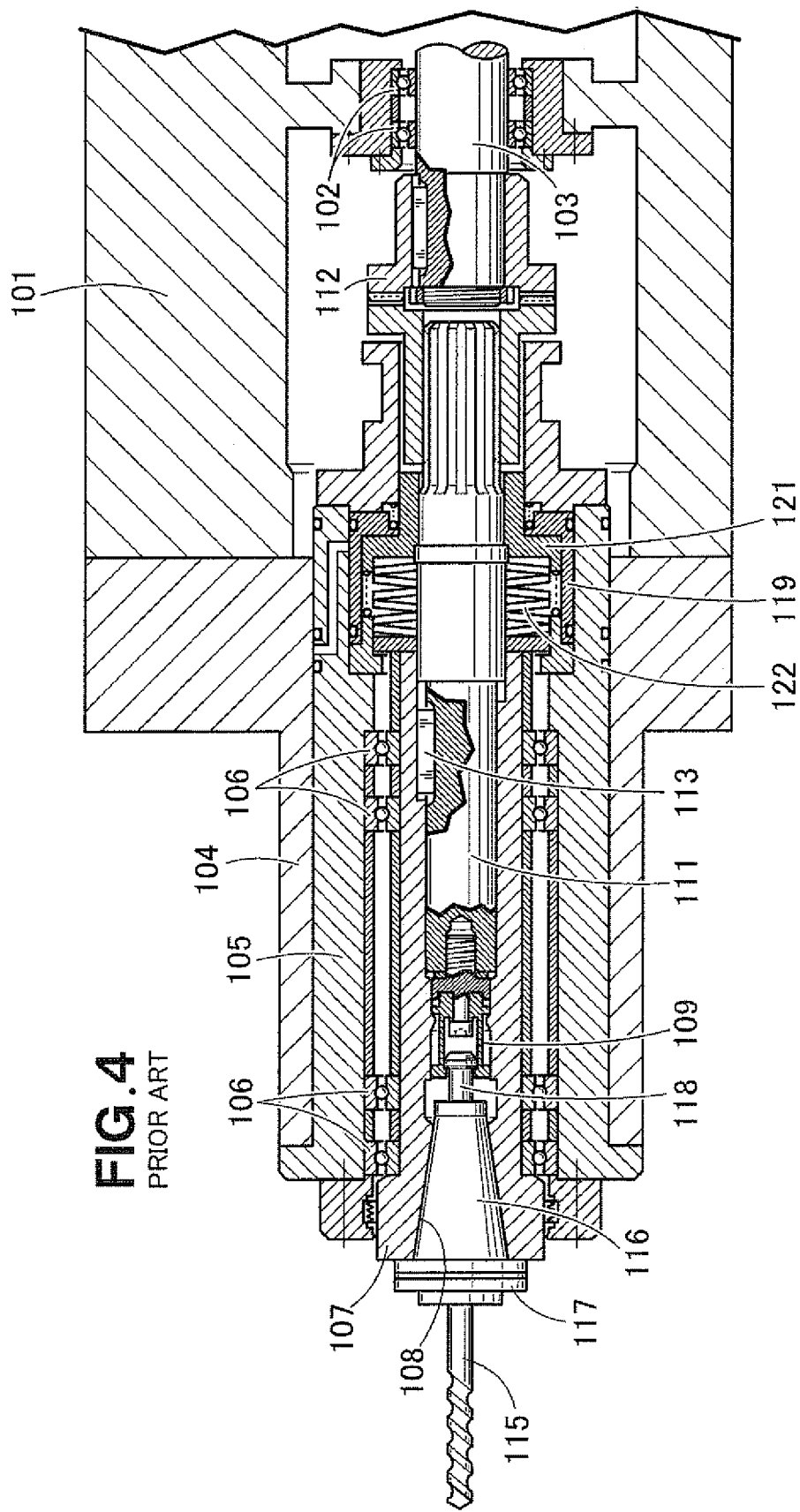
FIG. 4 is a diagram for describing a basic structure of a conventional technology.

The key (see FIG. 4, 113) adopted in the technology disclosed in Japan Patent No. 2557915 is not adopted according to the present disclosure.

Since the key is not present, the disc springs 61 are placed at a front side. Consequently, the disc springs 61 are placed within a distance L2 that is at least a half of a distance L1 in the axial direction from the tip of the draw bar 50 to the spring catch 51. By increasing the number of disc springs 61, the stroke of the draw bar 50 can be increased.

The draw bar 50 includes a bar main body 52 that includes the spring catch 51, a nozzle 53 in a tubular shape attached to the tip (front end) of the bar main body 52 so as to be movable in the axial direction, and a spring 54 which is retained in the bar main body 52 and which pushes forwardly the nozzle 53. According to this example, the forward movement limit (a forward movement maximum position) of the nozzle 53 is restricted by the collet driving member 43. As shown in FIG. 1, the draw bar 50 extends rearwardly in the axial direction from the spring catch 51 to the rear end of the draw bar a distance L3 that is less than the distance L2 within which the disc springs 61 are placed.

A coolant flow channel 56 through which a coolant 55 indicated by a white arrow is formed in the bar main body 52 and in the nozzle 53. The term coolant 55 means a cutting fluid that also serves as a cooling fluid.

The coolant 55 is supplied to the tool holder 10, and is also supplied to the rotating tool 11. The rotating tool 11 is efficiently cooled down, and a space relative to a workpiece subjected to cutting and machining is effectively lubricated, enabling a high-load cutting and machining.

Provided in a front-half portion 35 of the hollow main shaft 30 are a fluid passage 33 to detect that the male tapered portion 12 is properly attached to the circular conical hole 31, and an opening 34 to blow out the fluid. A fluid 36 indicated by, an arrow is supplied to the fluid passage 33. It is preferable that the fluid 36 should be air, but may be an inactive gas like nitrogen or other kinds of fluids.

Meanwhile, the fluid passage 33 may be provided in the solid part of the rear-half portion 37 of the hollow main shaft 30. In this case, however, it is necessary to thicken the rear-half portion 37. According to this embodiment, a clearance 62 is provided between the respective outer circumferences of the disc springs 61 and the wall surface of the spring retaining space 32, and the fluid 36 is caused to flow through this clearance 62.

This enables the rear-half portion 37 of the hollow main shaft 30 to be thinned, and thus the outer diameter of the disc spring 61 can be increased by what corresponds to this thinning.

According to this embodiment, the outer diameter of the disc spring 61 is set to be larger than the outer diameter of the collet retaining cylinder 41.

The disc spring 61 that has a large outer diameter has a leeway in allowable distortion. When the allowable distortion is large, a large stroke can be achieved by the relatively small number of disc springs 61.

Alternatively, when the number of disc springs 61 is set, the distortion per a disc spring 61 is defined. When the distortion is constant, the disc spring 61 that has a large outer diameter has small stress. The smaller the stress is, the smaller the load to the disc spring 61 becomes.

From the different standpoint, according to this embodiment, the length (a length in the axial direction) of the spring retaining space 32 can be reduced.

If the disc spring that has a small outer diameter has a small allowable distortion per a spring, and spring force is small. In order to achieve the desired total distortion (stroke) and spring force, it is necessary to increase the number of disc springs that have a small outer diameter. When the number is increased, the spring retaining space 32 should be elongated.

In this point, when the disc spring 61 that has a large diameter is adopted like this embodiment, the disc spring 61 has a large allowable distortion per a spring, and has large spring force. In order to achieve the desired total distortion (stroke) and the desired spring force, it is sufficient if the number of disc springs 61 is small. When the number is small, the length of the spring retaining space 32 can be reduced.

Next, the tool holder 10 is attached to the hollow main shaft 30 in such a way that the male tapered portion 12 abuts the circular conical hole 31. The pull stud 13 is inserted in the collet 42. The pull stud 13 contacts the nozzle 53. When the pull stud 13 is further inserted, the spring 54 is compressed, and the nozzle 53 is retracted.

Next, when the hydraulic pressure to the hydraulic cylinder 60 is set to be zero, because of the spring force by the disc springs 61, the draw bar 50 is moved to the right side in the figure (a direction becoming apart from the circular conical hole 31). This movement decreases the diameter of the collet 42.

Figure 2:
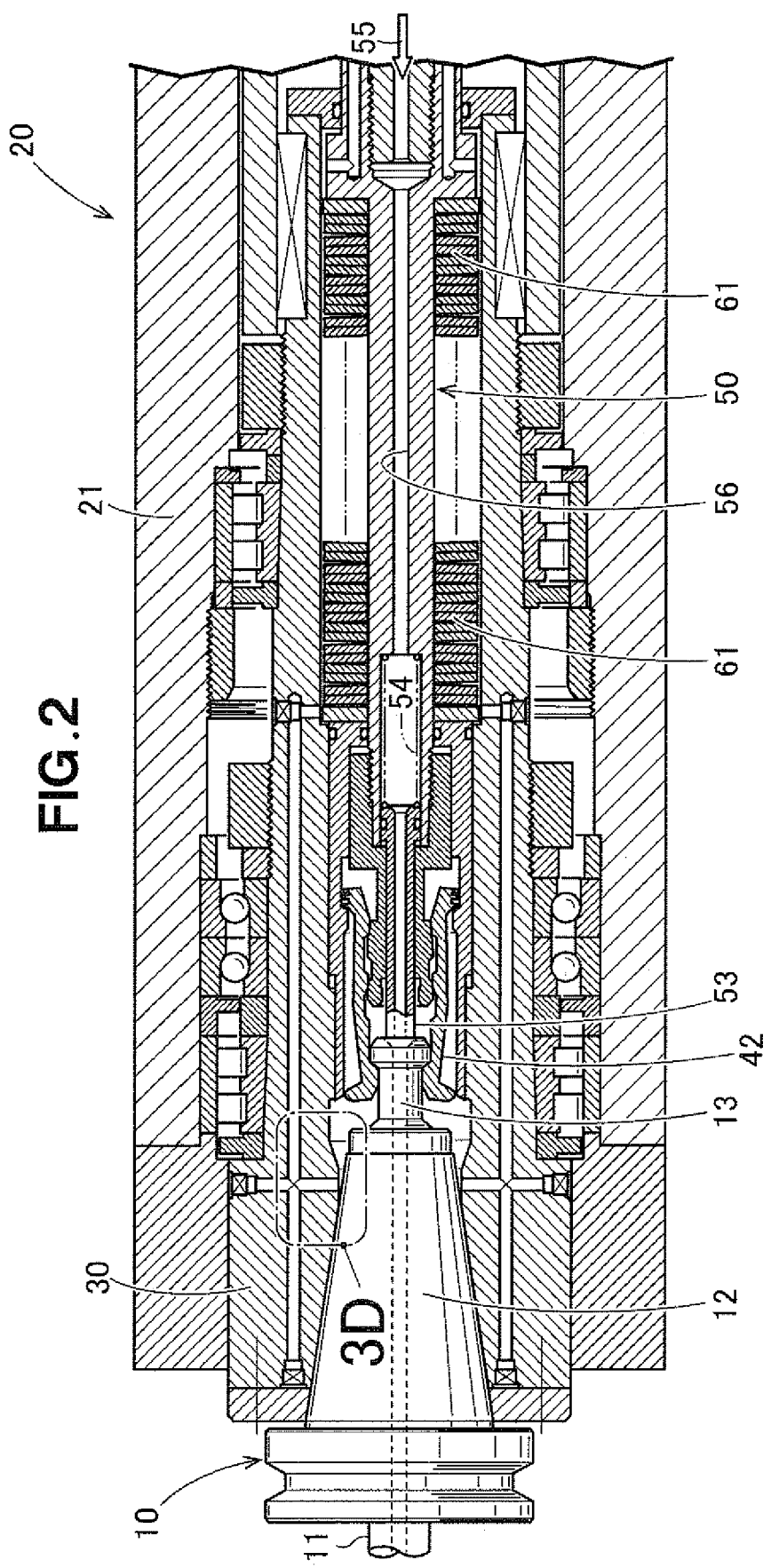
FIG. 2 is a diagram illustrating an action of the rotating-tool main shaft.

As illustrated in FIG. 2, the tool holder 10 is attached to the hollow main shaft 30. Because the nozzle 53 is depressed against the pull stud 13 by the spring 54, no coolant 55 leaks toward the collet 42.

When the hollow main shaft 30 is rotated, the tool holder 10 is rotated, and the rotating tool 11 is also rotated. At this time, the tool holder 10 rotates the collet chuck mechanism 40, and this collet chuck mechanism 40 rotates the draw bar 50. That is, the hollow main shaft 30 rotates together with the draw bar 50.

The hollow main shaft 30 is not mechanically coupled to the draw bar 50 via a coupling mechanism like a key.

In FIG. 1, because the tool holder 10 is not attached to the circular conical hole 31, even if the hollow main shaft 30 is rotated, the draw bar 50 does not rotate together. In FIG. 1, basically, the hollow main shaft 30 is not rotated. When it is necessary to rotate such a shaft as a test, a dummy holder corresponding to the tool holder 10 is attached. This allows the hollow main shaft 30 and the draw bar 50 to rotate together.

Next, a mechanism and a procedure to detect that the male tapered portion 12 is properly attached to the circular conical hole 31 will be described.

Figure 3A:
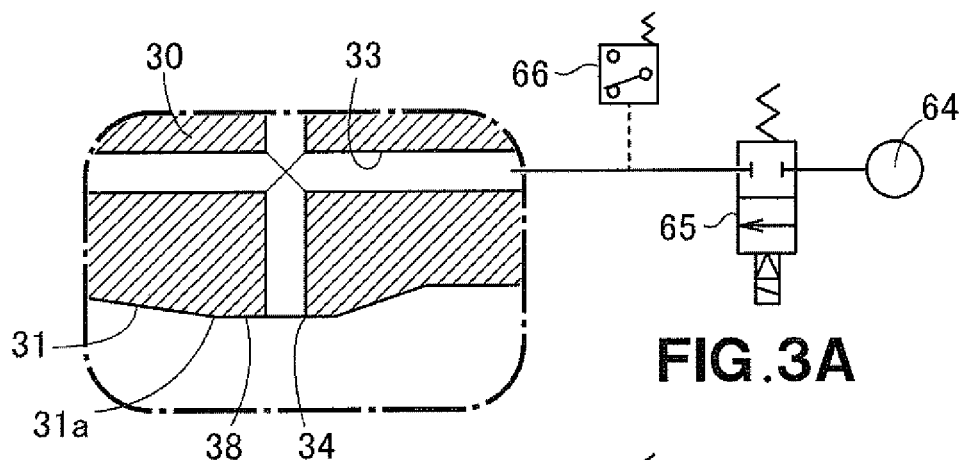
FIG. 3A is an enlarged view of a part 3A in FIG. 1.

FIG. 3A is an enlarged view of a part 3A in FIG. 1.

Preferably, as illustrated in FIG. 3A, a cylindrical portion 38 is extended from a small-diameter end 31a of the circular conical hole 31, and the opening 34 is provided in this cylindrical portion 38. Because the opening 34 is provided in an offset position from the circular conical hole 31, the opening 34 is prevented from being damaged by the male tapered portion 12.

The fluid (e.g., air) supplied from a fluid source 64 is blocked by an electro-magnetic valve 65, and thus the pressure at the fluid passage 33 becomes ambient pressure.

Figure 3B:
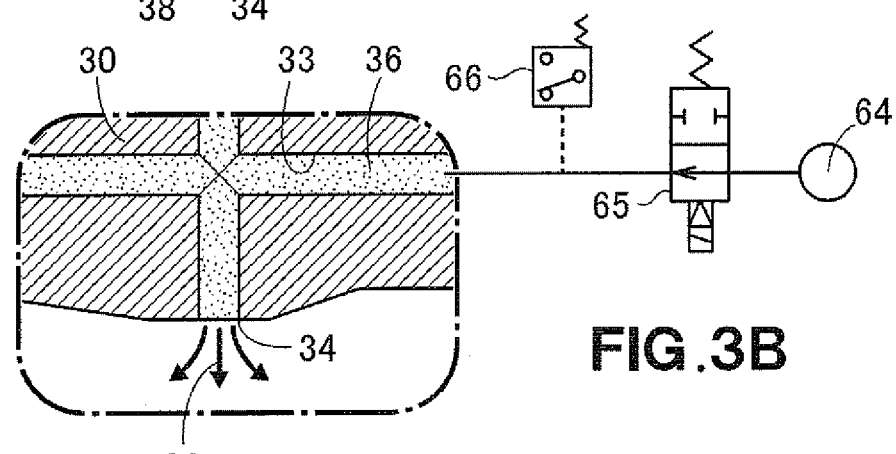
FIGS. 3B and 3C are diagrams each for describing a flow of a fluid.

Next, as illustrated in FIG. 3B, when the electro-magnetic valve 65 is opened, the fluid 36 passes through the fluid passage 33, and is blown out from the opening 34. Because it is blown out from the opening 34, the pressure at the fluid passage 33 does not increase.

Figure 3C:
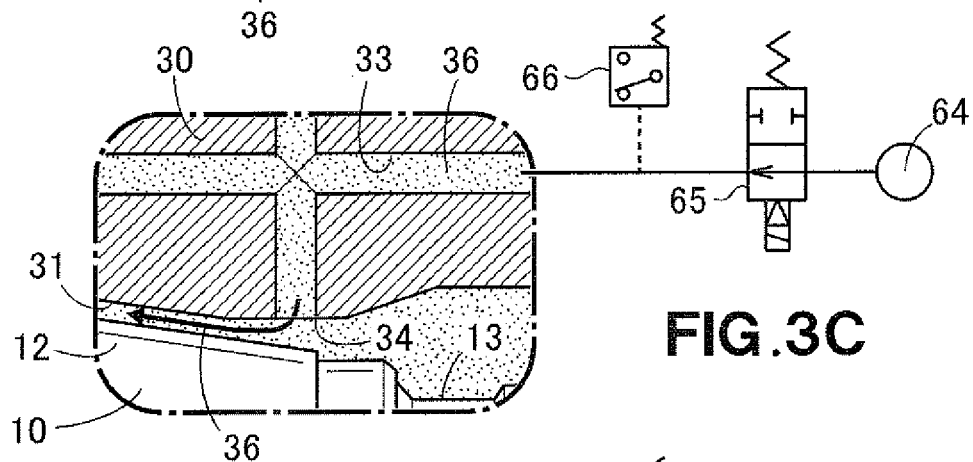

Subsequently, as illustrated in FIG. 3C, when the tool holder 10 is fitted in the circular conical hole 31, the axial line of the opening 34 intersects the male tapered portion 12 immediately before the completion of fitting.

This causes the blown fluid 36 to collide the male tapered portion 12. Next, the fluid 36 changes the flowing direction, and flows the clearance between the circular conical hole 31 and the male tapered portion 12 at fast speed. This fast-speed flow cleans the circular conical hole 31 and the male tapered portion 12. At this time, also, the pressure at the fluid passage 33 does not increase.

Figure 3D:
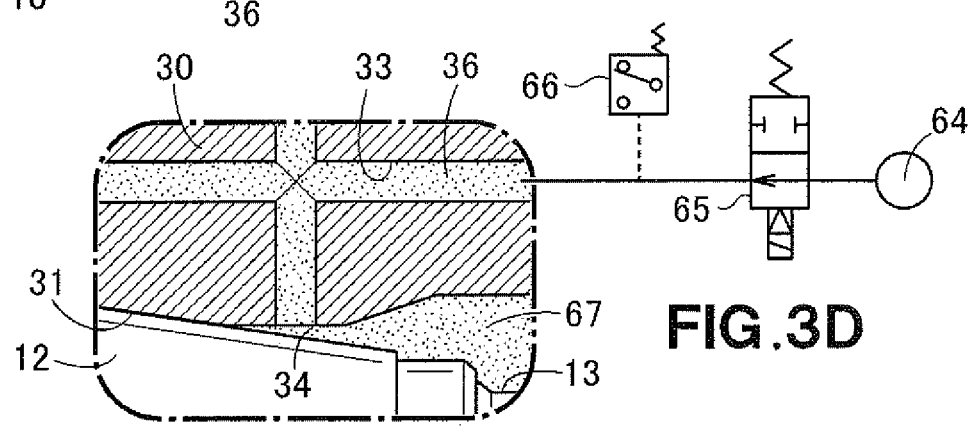
FIG. 3D is an enlarged view of a part 3D in FIG. 2.

FIG. 3D is an enlarged view of a part 3D in FIG. 2.

As illustrated in FIG. 3D, even if in a condition in which the male tapered portion 12 is fully fitted in the circular conical hole 31, the opening 34 is not blocked by the male tapered portion 12. The fluid 36 remains in a closed space 67 around the pull stud 13.

Because the fluid 36 does not leak, the pressure at the closed space 67 and the fluid passage 33 increases. The increasing pressure is detected by a pressure switch 66. When the pressure switch 66 is actuated, it is detected that the male tapered portion 12 is properly attached to the circular conical hole 31.

The pressure switch 66 may be a pressure sensor that measures pressure. However, the pressure sensor is relatively expensive. In this point, the pressure 66 is a switch that is simply formed by two contacts, thus relatively inexpensive.

Meanwhile, when the rotating tool 11 is frequently replaced, the states in FIGS. 1 and 2 are repeated, and the plurality of disc springs 61 is repeatedly elongated and compressed. A given disc spring 61 and the adjacent disc spring 61 thereto are directly in contact with each other, and are in friction with each other, and thus slight heat is generated. Moreover, because of the direct contact, a tiny amount of contamination (particles) is produced.

By causing the fluid to flow through the clearance (see FIG. 1, 62) around the respective outer circumferences of the disc springs 61, the disc springs 61 are cooled down by this fluid. The contamination around the disc springs 61 is cleaned.

Note that according to the embodiment, although the outer diameter of the disc spring 61 is larger than the outer diameter of the collet retaining cylinder 41, it may be smaller than the outer diameter of the collet retaining cylinder 41.

Moreover, according to the embodiment, although the coolant flow channel 56 is provided in the bar main body 52, the coolant flow channel 56 may be eliminated. When such a channel is eliminated, the nozzle 53 and the spring 54 become unnecessary, and thus the draw bar 50 is formed by the bar main body 52 only.

The present disclosure is suitable for a rotating-tool main shaft that rotates a tool holder.

What is claimed is:

1. A main shaft for rotating a tool holder which holds therein a rotary tool and which comprises a male tapered portion having a pull stud at a tail section thereof, the main shaft comprising:
a hollow ram;
a hollow main shaft retained in the hollow ram so as to be freely rotatable, the hollow main shaft having a circular conical hole formed in a front tip portion thereof, the circular conical hole being configured to receive therein the male tapered portion of the tool holder;
a collet chuck mechanism retained in the hollow main shaft and configured to releasably engage with the pull stud when the male tapered portion is received in the circular conical hole;
a draw bar having front and rear ends and disposed in the hollow main shaft to undergo axial movement in forward and rearward directions to axially move the collet chuck mechanism in forward and rearward directions;
a hydraulic cylinder connected to move the draw bar in the forward direction; and
a disc spring disposed in the hollow main shaft to move the draw bar in the rearward direction,
wherein the draw bar includes a spring catch which is disposed in the hollow main shaft and connected to move axially with the draw bar and which catches the disc spring,
wherein the disc spring is placed in the hollow main shaft within a first distance that is at least a half of a distance from the front end of the draw bar to the spring catch in the axial direction,
wherein the draw bar extends rearwardly in the axial direction from the spring catch to the rear end of the draw bar a second distance that is less than the first distance, and
wherein the draw bar comprises a bar main body that includes the spring catch, a nozzle attached to a front tip of the bar main body so as to be movable in the axial direction, a spring which is retained in the bar main body and which pushes the nozzle forwardly, and a coolant flow channel provided in the bar main body and in the nozzle through which a coolant flows during use of the main shaft.

2. A main shaft for rotating a tool holder which holds therein a rotary tool and which comprises a male tapered portion having a pull stud at a tail section thereof, the main shaft comprising:
a hollow ram;
a hollow main shaft retained in the hollow ram so as to be freely rotatable, the hollow main shaft having a circular conical hole formed in a front tip portion thereof, the circular conical hole being configured to receive therein the male tapered portion of the tool holder;
a collet chuck mechanism retained in the hollow main shaft and configured to releasably engage with the pull stud when the male tapered portion is received in the circular conical hole;
a draw bar having front and rear ends and disposed in the hollow main shaft to undergo axial movement in forward and rearward directions to axially move the collet chuck mechanism in forward and rearward directions;
a hydraulic cylinder connected to move the draw bar in the forward direction; and
a disc spring disposed in the hollow main shaft to move the draw bar in the rearward direction,
wherein the draw bar includes a spring catch which is disposed in the hollow main shaft and connected to move axially with the draw bar and which catches the disc spring,
wherein the disc spring is placed in the hollow main shaft within a first distance that is at least a half of a distance from the front end of the draw bar to the spring catch in the axial direction,
wherein the draw bar extends rearwardly in the axial direction from the spring catch to the rear end of the draw bar a second distance that is less than the first distance, and
wherein a clearance, through which a fluid flows during use of the main shaft, is provided between an outer circumference of the disk spring and a wall surface of a spring retaining space that retains therein the disc spring.

3. A main shaft for rotating a tool holder which holds therein a rotary tool and which comprises a male tapered portion having a pull stud at a tail section thereof, the main shaft comprising:
a hollow rain;
a hollow main shaft retained in the hollow ram so as to be freely rotatable, the hollow main shaft having a circular conical hole formed in a front tip portion thereof, the circular conical hole being configured to receive therein the male tapered portion of the tool holder;
a collet chuck mechanism retained in the hollow main shaft and configured to releasably engage with the pull stud when the male tapered portion is received in the circular conical hole;
a draw bar having front and rear ends and disposed in the hollow main shaft to undergo axial movement in forward and rearward directions to axially move the collet chuck mechanism in forward and rearward directions;
a hydraulic cylinder connected to move the draw bar in the forward direction; and
a disc spring disposed in the hollow main shaft to move the draw bar in the rearward direction,
wherein the draw bar includes a spring catch which is disposed in the hollow main shaft and connected to move axially with the draw bar and which catches the disc spring,
wherein the disc spring is placed in the hollow main shaft within a first distance that is at least a half of a distance from the front end of the draw bar to the spring catch in the axial direction,
wherein the draw bar extends rearwardly in the axial direction from the spring catch to the rear end of the draw bar a second distance that is less than the first distance, and
wherein the hollow main shaft has a spring retaining space surrounding an axial section of the draw bar, and wherein the disc spring comprises a plurality of disc springs disposed in the spring retaining space and arranged in a row in contact with one another, the outer circumferences of the disc springs being spaced from a wall surface of the spring retaining space to define a clearance for fluid to flow therethrough.

4. The main shaft according to claim 3; wherein the collet clutch mechanism comprises a collet retaining cylinder retained in the hollow main shaft, and a collet housed in the collet retaining cylinder; and wherein the outer diameters of the disc springs are larger than the outer diameter of the collet retaining cylinder.

5. The main shaft according to claim 3; wherein the hollow main shaft has fluid passages which communicate at one end with the clearance and communicate at another end with the circular conical hole, and means for sensing changes in pressure of fluid flowing through the clearance and fluid passages to detect whether the male tapered portion of the tool holder is fully fitted in the circular conical hole.

6. A main shaft for rotating a tool holder configured to hold a rotary tool and which comprises a male tapered portion having a pull stud at a tail section thereof, the main shaft comprising:
 a hollow ram;
 a hollow main shaft disposed in the hollow ram so as to be freely rotatable, the hollow main shaft having a conical hole in a front portion thereof, the conical hole having a shape that corresponds to that of the male tapered portion so that the male tapered portion of the tool holder can be fitted in the conical hole of the hollow main shaft;
 a collet chuck mechanism disposed in the hollow main shaft, the collet chuck mechanism being actuatable to an engaged state in which the collet chuck mechanism releasably engages with the pull stud when the male tapered portion is fitted in the conical hole, and a disengaged state in which the collet chuck mechanism is disengaged from the pull stud;
 a draw bar having front and rear ends and disposed in the hollow main shaft to undergo axial movement in forward and rearward directions to axially move the collet chuck mechanism in forward and rearward directions;
 means for moving the draw bar in the forward direction to actuate the collet clutch mechanism to the engaged state; and
 a plurality of disc springs disposed in the hollow main shaft and arranged in a row in contact with one another to move the draw bar in the rearward direction to actuate the collet chuck mechanism to the disengaged state,
 wherein the draw bar includes a spring catch disposed in the hollow main shaft and connected to move axially with the draw bar and which catches the disc springs,
 wherein the row of disc springs is placed in the hollow main shaft within a first distance that is at least a half of a distance from the front end of the draw bar to the spring catch in the axial direction,
 wherein the draw bar extends rearwardly in the axial direction from the spring catch to the rear end of the draw bar a second distance that is less than the first distance, and
 wherein the draw bar comprises a bar main body that includes the spring catch, a nozzle attached to a front tip of the bar main body so as to be movable in the axial direction, a spring which is retained in the bar main body and which pushes the nozzle forwardly, and a coolant flow channel provided in the bar main body and in the nozzle through which a coolant flows during use of the main shaft.

7. A main shaft for rotating a tool holder configure to hold a rotary tool and which comprises a male tapered portion having a pull stud at a tail section thereof, the main shaft comprising:
 a hollow ram;
 a hollow main shaft disposed in the hollow ram so as to be freely rotatable, the hollow main shaft having a conical hole in a front portion thereof, the conical hole having a shape that corresponds to that of the male tapered portion so that the male tapered portion of the tool holder can be fitted in the conical hole of the hollow main shaft;
 a collet chuck mechanism disposed in the hollow main shaft, the collet chuck mechanism being actuatable to an engaged state in which the collet chuck mechanism releasably engages with the pull stud when the male tapered portion is fitted in the conical hole, and a disengaged state in which the collet chuck mechanism is disengaged from the pull stud;
 a draw bar having front and rear ends and disposed in the hollow main shaft to undergo axial movement in forward and rearward directions to axially move the collet chuck mechanism in forward and rearward directions;
 means for moving the draw bar in the forward direction to actuate the collet clutch mechanism to the engaged state; and
 a plurality of disc springs disposed in the hollow main shaft and arranged in a row in contact with one another to move the draw bar in the rearward direction to actuate the collet chuck mechanism to the disengaged state,
 wherein the draw bar includes a spring catch disposed in the hollow main shaft and connected to move axially with the draw bar and which catches the disc springs,
 wherein the row of disc springs is placed in the hollow main shaft within a first distance that is at least a half of a distance from the front end of the draw bar to the spring catch in the axial direction,
 wherein the draw bar extends rearwardly in the axial direction from the spring catch to the rear end of the draw bar a second distance that is less than the first distance, and
 wherein a clearance, through which a fluid flows during use of the main shaft, is provided between an outer circumference of the disc springs and a wall surface of a spring retaining space that retains therein the disc springs.

8. A main shaft for rotating a tool holder configured to hold a rotary tool and which comprises a male tapered portion having a pull stud at a tail section thereof, the main shaft comprising:
 a hollow ram;
 a hollow main shaft disposed in the hollow ram so as to be freely rotatable, the hollow main shaft having a conical hole in a front portion thereof, the conical hole having a shape that corresponds to that of the male tapered portion so that the male tapered portion of the tool holder can be fitted in the conical hole of the hollow main shaft;
 a collet chuck mechanism disposed in the hollow main shaft, the collet chuck mechanism being actuatable to an engaged state in which the collet chuck mechanism releasably engages with the pull stud when the male tapered portion is fitted in the conical hole, and a disengaged state in which the collet chuck mechanism is disengaged from the pull stud;
 a draw bar having front and rear ends and disposed in the hollow main shaft to undergo axial movement in forward and rearward directions to axially move the collet chuck mechanism in forward and rearward directions;
 means for moving the draw bar in the forward direction to actuate the collet clutch mechanism to the engaged state; and a plurality of disc springs disposed in the hollow main shaft and arranged in a row in contact with one another to move the draw bar in the rearward direction to actuate the collet chuck mechanism to the disengaged state, wherein the draw bar includes a spring catch disposed in the hollow main shaft and connected to move axially with the draw bar and which catches the disc springs, wherein the row of disc springs is placed in the hollow main shaft within a first distance that is at least a half of a distance from the front end of the draw bar to the spring catch in the axial direction, wherein the draw bar extends rearwardly in the axial direction from the spring catch to the rear end of the draw bar a second distance that is less than the first distance, and wherein the hollow main shaft has a spring retaining space surrounding an axial section of the draw bar, and wherein the row of disc springs is disposed in the spring retaining space, the outer circumferences of the disc springs being spaced from a wall surface of the spring retaining space to define a clearance for fluid to flow therethrough.

9. The main shaft according to claim 8; wherein the collet clutch mechanism comprises a collet retaining cylinder retained in the hollow main shaft, and a collet housed in the collet retaining cylinder; and wherein the outer diameters of the disc springs are larger than the outer diameter of the collet retaining cylinder.

10. The main shaft according to claim 8; wherein the hollow main shaft has fluid passages which communicate at one end with the clearance and communicate at another end with the conical hole, and means for sensing changes in pressure of fluid flowing through the clearance and fluid passages to detect whether the male tapered portion of the tool holder is fully fitted in the conical hole.

11. A main shaft for rotating a tool holder configured to hold a rotary tool and which comprises a male tapered portion having a pull stud at a tail section thereof, the main shaft comprising:

a hollow ram;

a hollow main shaft disposed in the hollow ram so as to be freely rotatable, the hollow main shaft having a conical hole in a front portion thereof, the conical hole having a shape that corresponds to that of the male tapered portion so that the male tapered portion of the tool holder can be fitted in the conical hole of the hollow main shaft;

a collet chuck mechanism disposed in the hollow main shaft, the collet chuck mechanism being actuatable to an engaged state in which the collet chuck mechanism releasably engages with the pull stud when the male tapered portion is fitted in the conical hole, and a disengaged state in which the collet chuck mechanism is disengaged from the pull stud;

a draw bar having front and rear ends and disposed in the hollow main shaft to undergo axial movement in forward and rearward directions to axially move the collet chuck mechanism in forward and rearward directions;

means for moving the draw bar in the forward direction to actuate the collet clutch mechanism to the engaged state; and a plurality of disc springs disposed in the hollow main shaft and arranged in a row in contact with one another to move the draw bar in the rearward direction to actuate the collet chuck mechanism to the disengaged state, wherein the draw bar includes a spring catch disposed in the hollow main shaft and connected to move axially with the draw bar and which catches the disc springs, wherein the row of disc springs is placed in the hollow main shaft within a first distance that is at least a half of a distance from the front end of the draw bar to the spring catch in the axial direction, wherein the draw bar extends rearwardly in the axial direction from the spring catch to the rear end of the draw bar a second distance that is less than the first distance, and wherein the hollow main shaft has fluid passages which communicate at one end with the clearance and communicate at another end with the conical hole, and means for sensing changes in pressure of fluid flowing through the clearance and fluid passages to detect whether the male tapered portion of the tool holder is fully fitted in the conical hole.

* * * * *